(12) United States Patent
Yun et al.

(10) Patent No.: US 11,610,443 B2
(45) Date of Patent: Mar. 21, 2023

(54) VEHICLE, AND CONTROLLING METHOD THEREOF

(71) Applicants: Hyundai Motor Company, Seoul (KR); Kia Corporation, Seoul (KR)

(72) Inventors: Jeong-gi Yun, Seoul (KR); Seokgyu Kim, Seongnam-si (KR)

(73) Assignees: Hyundai Motor Company, Seoul (KR); Kia Corporation, Seoul (KR)

(*) Notice: Subject to any disclaimer, the term of this patent is extended or adjusted under 35 U.S.C. 154(b) by 0 days.

(21) Appl. No.: 17/515,775

(22) Filed: Nov. 1, 2021

(65) Prior Publication Data

US 2022/0139134 A1 May 5, 2022

(30) Foreign Application Priority Data

Nov. 2, 2020 (KR) .................. 10-2020-0144819

(51) Int. Cl.
*G07C 9/00* (2020.01)
*H04W 4/80* (2018.01)
*H04W 4/46* (2018.01)

(52) U.S. Cl.
CPC .......... *G07C 9/00309* (2013.01); *H04W 4/46* (2018.02); *H04W 4/80* (2018.02); *G07C 2009/00476* (2013.01)

(58) Field of Classification Search
CPC ..... G07C 9/00309; G07C 2009/00476; H04W 4/46; H04W 4/80
See application file for complete search history.

(56) References Cited

U.S. PATENT DOCUMENTS

| 2019/0061689 | A1* | 2/2019 | Breer | B60R 25/245 |
| 2021/0136556 | A1* | 5/2021 | Lee | G01S 13/765 |
| 2021/0304535 | A1* | 9/2021 | Studerus | G07C 9/00309 |
| 2022/0038303 | A1* | 2/2022 | Park | H04W 52/0245 |
| 2022/0284752 | A1* | 9/2022 | Hong | G07C 9/00309 |

* cited by examiner

*Primary Examiner* — Nabil H Syed
(74) *Attorney, Agent, or Firm* — Slater Matsil, LLP

(57) ABSTRACT

An embodiment vehicle includes a UWB (ultra-wideband) module configured to receive a UWB signal transmitted from a smart key, and a controller configured to determine a location of the smart key based on the UWB signal received through the UWB module, control the UWB module to stop UWB communication after a first reference time has elapsed from a point of time at which the UWB module starts communication, and control the UWB module to restart the UWB communication after a second reference time has elapsed from a point of time at which the UWB module stops communication.

20 Claims, 6 Drawing Sheets

110 : 111 ~ 117

VEHICLE, AND CONTROLLING METHOD THEREOF

CROSS-REFERENCE TO RELATED APPLICATIONS

This application claims the benefit of Korean Patent Application No. 10-2020-0144819, filed on Nov. 2, 2020, which application is hereby incorporated herein by reference.

TECHNICAL FIELD

The present disclosure relates to a vehicle and a controlling method thereof.

BACKGROUND

As vehicle information technology (IT) develops, current vehicles provide various functions for user convenience in addition to functions as a basic means of transportation.

More specifically, the existing vehicle entry and exit method was a physical method of directly inserting the key into the vehicle, but recently, technologies have been developed that allow access to the vehicle in a more convenient way, such as a smart key or digital key, which is recognized wirelessly from a certain distance outside the vehicle and controls door unlocking.

The conventional smart key system performs authentication for the smart key by receiving an RF (radio frequency) response signal to the corresponding LF (low frequency) signal from the smart key and by transmitting a LF signal from the smart key controller (SMK ECU) to the smart key in order to determine whether the smart key has a legitimate authority for the vehicle, and performs authentication for the smart key.

However, recently, research on a vehicle entry/exit starting system for opening a vehicle door through ultra-wideband (UWB) communication rather than such a communication method is being conducted.

SUMMARY

The present disclosure relates to a vehicle and a controlling method thereof. Particular embodiments relate to a vehicle that stops UWB communication with a smart key or a smart phone for a predetermined time and restarts for a predetermined time again, and a controlling method thereof.

One embodiment of the disclosed invention performs UWB communication with the smart key, and after a predetermined time has elapsed, the UWB communication may be stopped and restarted for the predetermined time, thereby preventing power consumption due to UWB communication, and providing a vehicle that may be controlled through UWB communication of a smart key even after a predetermined time has elapsed, and a control method thereof.

In accordance with an embodiment of the present disclosure, a vehicle includes a UWB module configured to receive a UWB signal transmitted from a smart key and a controller configured to determine a location of the smart key based on the UWB signal received through the UWB module, wherein the controller may control the UWB module to stop UWB communication after a first reference time has elapsed from a point of time at which the UWB module starts communication, and may control the UWB module to restart the UWB communication after a second reference time has elapsed from a point of time at which the UWB module stops communication.

The controller may control the UWB module to stop the UWB communication after the first reference time has elapsed from a point of time at which the UWB module restarts communication.

The controller may change the first reference time and the second reference time based on the distance between the smart key and the vehicle at a point of time at which the UWB module restarts communication.

The controller may decrease the first reference time and increase the second reference time as the distance between the smart key and the vehicle at the point of time at which the UWB module restarts communication increases.

The controller may set a plurality of reference regions with a preset range from the vehicle, and determine the first reference time and the second reference time based on the reference region where the smart key is located at the point of time at which UWB module restarts communication.

The controller may decrease the first reference time corresponding to the reference region and increase the second reference time as the reference region is located farther away from the vehicle.

The controller is configured to set the plurality of reference regions based on the reception state of the UWB communication at the point of time at which the UWB module starts communication.

The controller is configured to control the UWB module to stop the UWB communication after a third reference time has elapsed from the point of time the UWB module starts communication.

The vehicle further includes a Bluetooth module that receives a Bluetooth signal transmitted from the smart key, wherein the controller is configured to control the UWB module to start the UWB communication at a point of time at which a reception of the Bluetooth signal starts.

The controller may control the UWB module to stop the UWB communication in response to the smart key being outside the region with a preset range from the vehicle at a point of time at which the reception of the Bluetooth signal is disconnected.

In accordance with one embodiment of the present disclosure, a method for controlling a vehicle includes receiving a UWB signal transmitted from a smart key by a UWB module, determining a location of the smart key based on the UWB signal, controlling the UWB module to stop UWB communication after a first reference time has elapsed from a point of time at which the UWB module starts communication, and controlling the UWB module to restart the UWB communication after a second reference time has elapsed from a point of time at which the UWB module stops communication.

The method for controlling the vehicle may further include controlling the UWB module to stop the UWB communication after the first reference time has elapsed from a point of time at which the UWB module restarts communication.

The method for controlling the vehicle may further include changing the first reference time and the second reference time based on the distance between the smart key and the vehicle at the point of time at which UWB module restarts communication.

The changing of the first reference time and the second reference time may include decreasing the first reference time and increasing the second reference time as the distance between the smart key and the vehicle at the point of time at which UWB module restarts communication increases.

The method for controlling the vehicle may further include setting a plurality of reference regions having a preset range from the vehicle and determining the first reference time and the second reference time based on a reference region where the smart key is located at the point of time at which UWB module restarts communication.

The determining of the first reference time and the second reference time may include decreasing the first reference time corresponding to the reference region and increasing the second reference time as the reference region is located further away from the vehicle.

The method for controlling the vehicle may further include setting the plurality of reference regions based on the reception state of the UWB communication at the point of time at which UWB module starts communication.

The method for controlling the vehicle may further include controlling the UWB module to stop the UWB communication after a third reference time has elapsed from the point of time the UWB module starts communication.

The method for controlling the vehicle may further include receiving a Bluetooth signal transmitted from the smart key and controlling the UWB module to start the UWB communication at a point of time at which a reception of the Bluetooth signal starts.

The method for controlling the vehicle may further include controlling the UWB module to stop the UWB communication in response to the smart key being outside a region having a preset range from the vehicle at a point of time at which the reception of the Bluetooth signal is disconnected.

BRIEF DESCRIPTION OF THE DRAWINGS

These and/or other embodiments of the present invention will become apparent and more readily appreciated from the following description of the embodiments, taken in conjunction with the accompanying drawings, in which.

DETAILED DESCRIPTION OF ILLUSTRATIVE EMBODIMENTS

Figure 1:
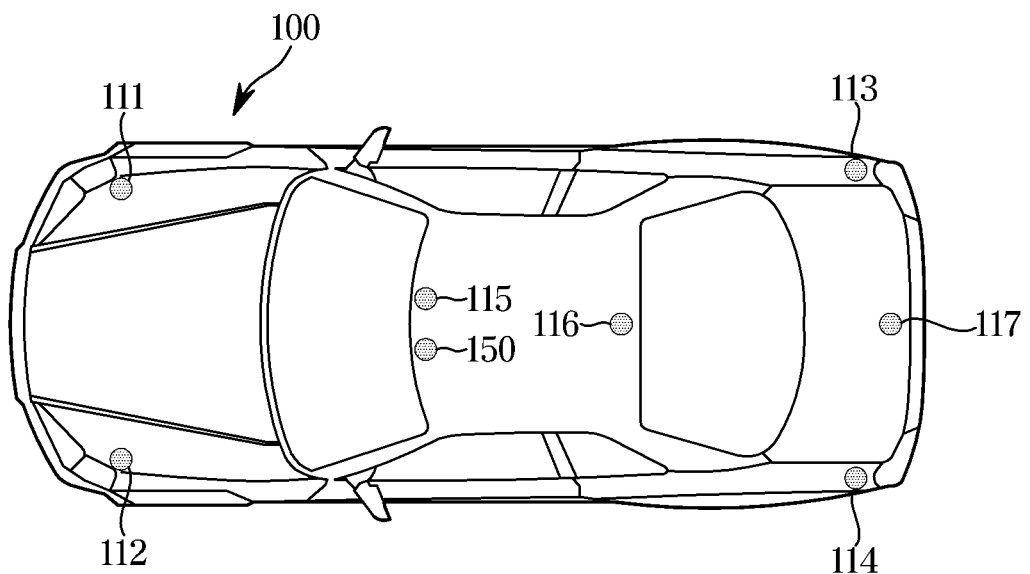
FIG. 1 is a perspective view illustrating the exterior of a vehicle according to an embodiment.

Like numerals refer to like elements throughout the specification. Not all elements of embodiments of the present invention will be described, and description of what are commonly known in the art or what overlap each other in the embodiments will be omitted. The terms as used throughout the specification, such as "~part", "~module", "~member", "~block", etc., may be implemented in software and/or hardware, and a plurality of "~parts", "~modules", "~members", or "~blocks" may be implemented in a single element, or a single "~part", "~module", "~member", or "~block" may include a plurality of elements.

It will be further understood that the term "connect" or its derivatives refer both to direct and indirect connection, and the indirect connection includes a connection over a wireless communication network.

It will be further understood that the terms "comprises" and/or "comprising," when used in this specification, identify the presence of stated features, integers, steps, operations, elements, and/or components, but do not preclude the presence or addition of one or more other features, integers, steps, operations, elements, components, and/or groups thereof, unless the context clearly indicates otherwise.

In the specification, it will be understood that, when a member is referred to as being "on/under" another member, it can be directly on/under the other member, or one or more intervening members may also be present.

The terms including ordinal numbers like "first" and "second" may be used to explain various components, but the components are not limited by the terms. The terms are only for the purpose of distinguishing a component from another.

As used herein, the singular forms "a," "an" and "the" are intended to include the plural forms as well, unless the context clearly indicates otherwise.

Reference numerals used for method steps are just used for convenience of explanation, but not to limit an order of the steps. Thus, unless the context clearly dictates otherwise, the written order may be practiced otherwise.

Hereinafter, the operating principles and embodiments of the present invention will be described with reference to the accompanying drawings.

Figure 2:
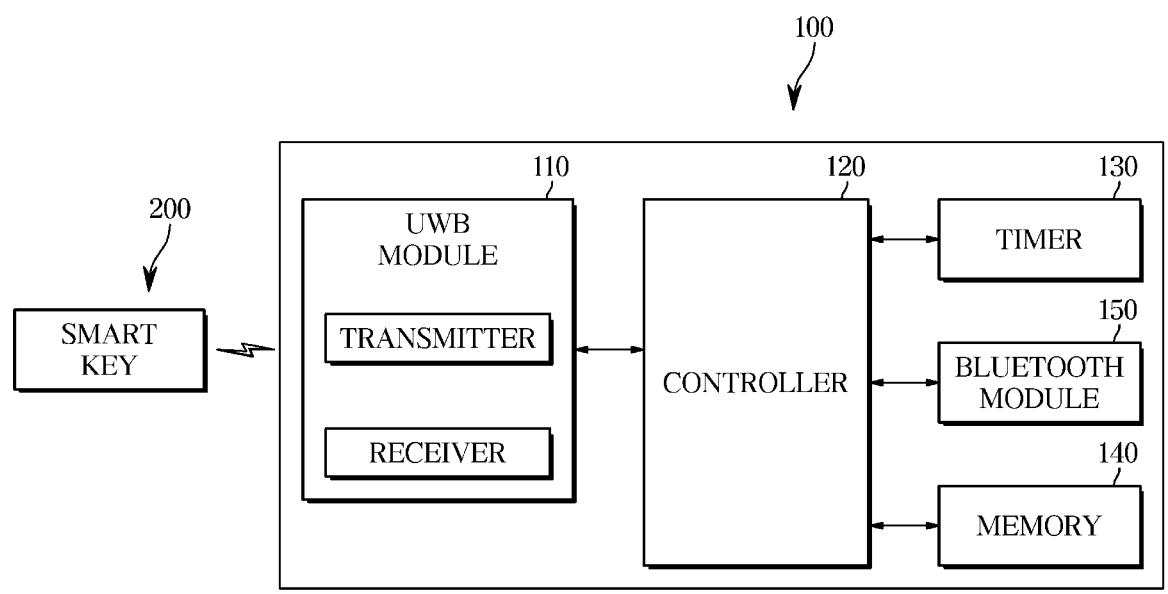
FIG. 2 is a control block diagram of a vehicle according to an embodiment.

FIG. 1 is a perspective view illustrating the exterior of a vehicle according to an embodiment, and FIG. 2 is a control block diagram of a vehicle according to an embodiment.

Referring to FIGS. 1 and 2, a vehicle 100 according to an embodiment may include a UWB module no, a controller 120, a timer 130, a memory (i.e., a storage) 140, and a Bluetooth module 150.

The UWB module no of the vehicle 100 may include a plurality of ultra-wide band modules (hereinafter, UWB modules 111 to 117).

The UWB module no may be located between a headlining and the vehicle body for sensing inside and outside the vehicle, and may also be located in the trunk.

However, the number and location of the UWB modules no are not limited thereto, and fewer or more UWB modules no may be installed in various locations of the vehicle 100 according to the specification or performance of the vehicle 100. Each of the plurality of UWB modules no may be provided at a preset location of the vehicle 100.

The Bluetooth module 150 may receive a BLE signal transmitted from a smart key 200. The Bluetooth module 150 may be located between the headlining and the vehicle body in order to perform BLE communication with the smart key 200 inside and outside the vehicle. However, the number and location of the Bluetooth module 150 is not limited thereto, and fewer or more Bluetooth modules 150 may be installed in various locations of the vehicle 100 according to the specifications or performance of the vehicle mo.

The UWB module no according to an embodiment may include a transmitter and a receiver. The transmitter may transmit a UWB signal (hereinafter, 'authentication signal') for communicating with the smart key 200 of the vehicle 100, and the authentication signal may be a signal generated based on a UWB impulse signal.

The authentication signal transmitted by the transmitter may mean a response signal to the UWB signal transmitted from the smart key 200, and the UWB signal and the response signal transmitted from the smart key 200 may include a preset data packet. The smart key 200 may transmit a re-response signal once again in response to the response signal transmitted from the UWB module no. In this case, the UWB signal transmitted from the smart key 200 may also be a signal generated based on the UWB impulse signal.

In addition, the authentication signal transmitted by the transmitter may mean a search signal (Query) for searching a location of the smart key 200, and the smart key 200 may transmit the response signal including the preset data packet in response to the search signal transmitted from the transmitter.

That is, the transmitter may transmit the authentication signal in response to the receiver receiving the UWB signal including the preset data packet from the smart key 200, and in this case, the smart key 200 becomes an initiator, and the UWB module no may be a responder.

In addition, the transmitter may transmit the authentication signal including the preset data packet according to control of the controller 120 when a preset condition is satisfied or every preset period, and in this case, the UWB module no becomes the initiator and the smart key 200 may be the responder.

The preset condition may include a situation in which an object around the vehicle 100 is sensed through a sensor of the vehicle 100. The transmitter may transmit the authentication signal in all directions.

The smart key 200 is a device having a communication module capable of transmitting the UWB signal including the preset data packet corresponding to the vehicle 100, and may include a FOB key of the vehicle 100 and/or a user terminal. The user terminal may be interlocked with the vehicle 100 through communication with the vehicle 100, and may include a portable terminal capable of accessing the vehicle 100 through a network. For example, the user terminal includes all kinds of handheld-based wireless communication devices such as smart phones, and a wearable device such as a watch, a ring, a bracelet, an anklet, a necklace, glasses, a contact lens, or a head-mounted-device (HMD).

The receiver may include a receiving antenna capable of receiving the UWB signal transmitted from the smart key 200 of the vehicle 100. For example, the antenna may include a UWB antenna.

The antenna of the receiver may receive the UWB signal transmitted from the smart key 200. As described above, the UWB signal transmitted from the smart key 200 may mean a signal transmitted every preset period from the smart key 200, and may also mean a re-response signal transmitted from the smart key 200 in response to the authentication signal output from the transmitter.

The controller 120 may determine the location of the smart key 200 based on the UWB signal received through each of the plurality of UWB modules 111 to 117.

Specifically, since each of the plurality of UWB modules 111 to 117 is provided at different locations, an arrival time of the UWB signal received by each UWB module 111 to 117 may be different from each other, and the controller 120 may determine the location of the smart key 200 by using the difference in the arrival time.

Furthermore, in case of each of the plurality of UWB modules 111 to 117 transmitting a response signal in response to the UWB signal (Poll signal) transmitted from the smart key 200, the smart key 200 may transmit a re-response signal (final signal) in response to the response signal, and the controller 120 may calculate a distance between each UWB module in to 117 and the smart key 200 based on a difference between a transmission time of the response signal and a reception time of the re-response signal (final signal). At this time, if there are at least three UWB modules 110, the controller 120 may determine an exact location of the smart key 200 by employing a triangulation method.

In this way, the controller 120 may determine the location of the smart key 200 based on various locating algorithms. As described above, the controller 120 may determine the location of the smart key 200 based on a time difference of arrival (TDoA) of the UWB signal, and determine the location of the smart key 200 based on a time of flight (TOF)-based two way ranging (TWR) method. In addition to this, the controller 120 may identify the location of the smart key 200 using various locating algorithms such as Angle of Arrival (AoA), Angle of Departure (AoD), Time of Arrival (ToA), Time of Flight (ToF), etc., and the algorithm for estimating the location of the smart key 200 is not limited thereto.

To estimate the location of the smart key, the above-described methods of ToF, AoA, ToA, and TDoA are used, and the obtained distance values are combined to estimate the location of the smart key using methods such as trilateration and triangulation. In this case, a locating algorithm may be implemented by using various filter circuits such as a Kalman filter and a noise filter.

The controller 120 may control various components of the vehicle 100 based on the location of the smart key 200. That is, the vehicle 100 may provide a specific function in which the smart key 200 is used based on the location of the smart key 200. For example, in response to the smart key 200 entering the region A1 having a preset range from the vehicle 100, the controller 120 may unlock the door by controlling a door locking device.

The controller 120 may control the UWB module 110 to stop the UWB communication after the first reference time has elapsed from a point of time at which the UWB module 110 and the smart key 200 start communication. Specifically, in response to the user holding the smart key 200 approaching the vehicle 100, UWB communication starts at a specific time, and the controller 120 may continuously determine the location of the smart key 200 until the first reference time has elapsed from a point of time at which the UWB module 110 and the smart key 200 start communication.

The first reference time may be a time for UWB communication between the UWB module 110 and the smart key 200 so that the controller 120 may determine the location of the smart key 200. The first reference time may be changed through a process to be described later.

A point of time at which the UWB module 110 and the smart key 200 start communication may be a time the user approaches within a certain distance from the vehicle 100, and a specific example will be described later with reference to FIG. 5.

Even if the UWB communication is stopped after the first reference time has elapsed, the user may move locations while holding the smart key 200. At this time, since UWB communication is stopped, the controller 120 may not be able to determine the location of the smart key 200.

As such, in response to the first reference time passing without the user performing the control of the vehicle 100 using the smart key 200, the UWB communication may be stopped. That is, it is possible to prevent an increase in power consumption and discharge of the battery of the vehicle 100 by stopping UWB communication for a certain period of time in a state where it is unclear when the smart key 200 will approach within the range for controlling the vehicle 100.

However, in response to continuing to maintain the stopped state of UWB communication in order to prevent this increase in power consumption, it is difficult to grasp that the user approaches the vehicle 100 again later. That is, since UWB communication is stopped, when the user tries to unlock the door, it may not be possible by using the UWB communication of the smart key 200. In this case, for example, the user may unlock the door by directly manipulating a button provided on the door, but this may take an excessive amount of time and may be inconvenient.

The controller 120 may control the UWB module 110 to restart UWB communication when the second reference time has elapsed from a time at which the UWB module no stops communication.

The second reference time may be a time during which the UWB module 110 does not perform UWB communication with the smart key 200. Since the vehicle stops UWB communication during the second reference time, an increase in power consumption may be prevented. The second reference time may be changed through a process to be described below.

The time at which the UWB module no and the smart key 200 stop communication may be a time at which the UWB communication is stopped after the first reference time from the time at which the UWB module 110 first starts communication or a time at which UWB communication is stopped after the first reference time has elapsed from a time at which the UWB module no restarts communication.

That is, the controller 120 may control the UWB module 110 to stop UWB communication when the first reference time has elapsed from the time at which the UWB module no restarts communication.

The time at which the UWB module no and the smart key 200 restart communication may be a time at which the second reference time has elapsed from the time at which the UWB module 110 stops communication.

As such, the UWB module no may stop UWB communication after the first reference time has elapsed from a time at which the first communication starts while performing communication with the smart key 200, restart UWB communication after the second reference time has elapsed from the time at which UWB communication is stopped, stop UWB communication again after the first reference time has elapsed from the time at which the UWB communication is restarted, and restart UWB communication again when the second reference time passes from the time at which the UWB communication is stopped again.

That is, after the UWB communication module performs UWB communication for the first reference time, the process of stopping UWB communication for the second reference time may be repeated continuously.

As a result, the vehicle 100 may provide a specific function in which the smart key 200 is used, such as unlocking the door, based on the location of the smart key 200 during the first reference time during which UWB communication is being performed, and may not determine the location of the smart key 200 during the second reference time during which UWB communication is stopped, but power consumption may be saved.

The controller 120 may control the UWB module 110 to repeat the execution and interruption of UWB communication in this way, and control the UWB module no to stop the UWB communication after the third reference time has elapsed from a time at which the UWB module no first starts communication with the smart key 200.

The third reference time may be the maximum amount of time that may be performed to control repeating that UWB communication is stopped and restarted. The third reference time may be preset.

In response to UWB communication being stopped, the process of repeatedly performing and stopping UWB communication as described above is also stopped, and the vehicle 100 may prevent power consumption due to UWB communication.

In this case, in response to the user wanting the vehicle 100 to restart UWB communication again, a method of touching a handle provided on the door may be taken. That is, the controller 120 may control the UWB module no to perform UWB communication with the smart key 200 again in response to the handle provided on the door sensing the user's input after the UWB communication is stopped.

In addition, the controller 120 may control the UWB module no to repeat the execution and interruption of UWB communication, and provide a specific function that the smart key 200 is used according to the user's smart key 200 operation in response to the smart key 200 being within the region A1 having the preset range from the vehicle 100, and then control the UWB module no to terminate UWB communication.

The timer 130 may measure time. The timer 130 may measure the time from the time at which the UWB module no starts or restarts communication. The controller 120 may determine whether the first reference time has elapsed based on the time measured by the timer 130. The timer 130 may reset a measurement time in response to the UWB module 110 stopping communication after the first reference time has elapsed from the time at which the UWB module 110 starts communication.

The timer 130 may measure the time again from the time at which the UWB module 110 stops communication. The controller 120 may determine whether the second reference time has elapsed based on the time measured by the timer 130. The timer 130 may reset a measurement time in response to the UWB module 110 restarting communication after the second reference time has elapsed from the time at which the UWB module 110 starts communication.

The controller 120 may control the UWB module 110 according to whether the first reference time and the second reference time have elapsed based on the time measured by the timer 130.

The controller 120 for performing the above-described operation or an operation to be described below may be implemented as at least one memory that stores data about an algorithm for controlling the operation of components in the vehicle 100 or a program reproducing the algorithm, and as at least one processor that performs the above-described operation using data stored in the at least one memory.

The memory 140 may store a program for performing the above-described operation and an operation to be described later, and the processor may execute the stored program. In case of the memory 140 and the processor being plural, they may be integrated into one chip, or may be provided in physically separate locations. The memory 140 may include a volatile memory such as a static random access memory (S-RAM) or a dynamic random access memory (D-RAM) for temporarily storing data. In addition, the memory 140 may include a non-volatile memory such as a ROM (Read Only Memory), Erasable Programmable Read Only Memory (EPROM), or Electrically Erasable Programmable Read Only Memory (EEPROM) for long-term storing of control programs and control data. The processor may include various logic circuits and arithmetic circuits, process data according to a program provided from the memory 140, and generate a control signal according to the processing result.

In the above, the components of the vehicle wo according to an embodiment have been described. Various components included in the vehicle wo may communicate with each other through a communication network for the vehicle.

The communication network for the vehicle may adopt a communication protocol such as Media Oriented Systems Transport (MOST) with a communication speed of up to 24.5 Mbps (Mega-bits per second), FlexRay with a communication speed of up to 10 Mbps, and 125 kbps (kilo-bits per second), Controller Region Network (CAN) having a communication speed of 1 Mbps or Local Interconnect Network (LIN) having a communication speed of 20 kbps. Such a communication network for the vehicle wo may employ not only a single communication protocol such as MOS, FlexRay, CAN, and LIN, but also a plurality of communication protocols.

At least one component may be added or deleted according to the performance of the components described above. In addition, it will be readily understood by those of ordinary skill in the art that the mutual locations of the components may be changed corresponding to the performance or structure of the system.

In embodiments of the present invention, the controller 120 performs UWB communication from the time at which UWB communication is restarted before the first reference time elapses, and stops UWB communication from the time at which the UWB communication is stopped before the second reference time elapses. That is, UWB communication is performed during the first reference time, and UWB communication is stopped during the second reference time.

In general, it may be said that the closer the user holding the smart key 200 is to the vehicle, the higher the intention to use the smart key 200 is. That is, it may be preferable that the first reference time for performing UWB communication be longer and the second reference time to stop UWB communication be shorter as the user holding the smart key 200 is closer to the vehicle 100.

Figure 3:
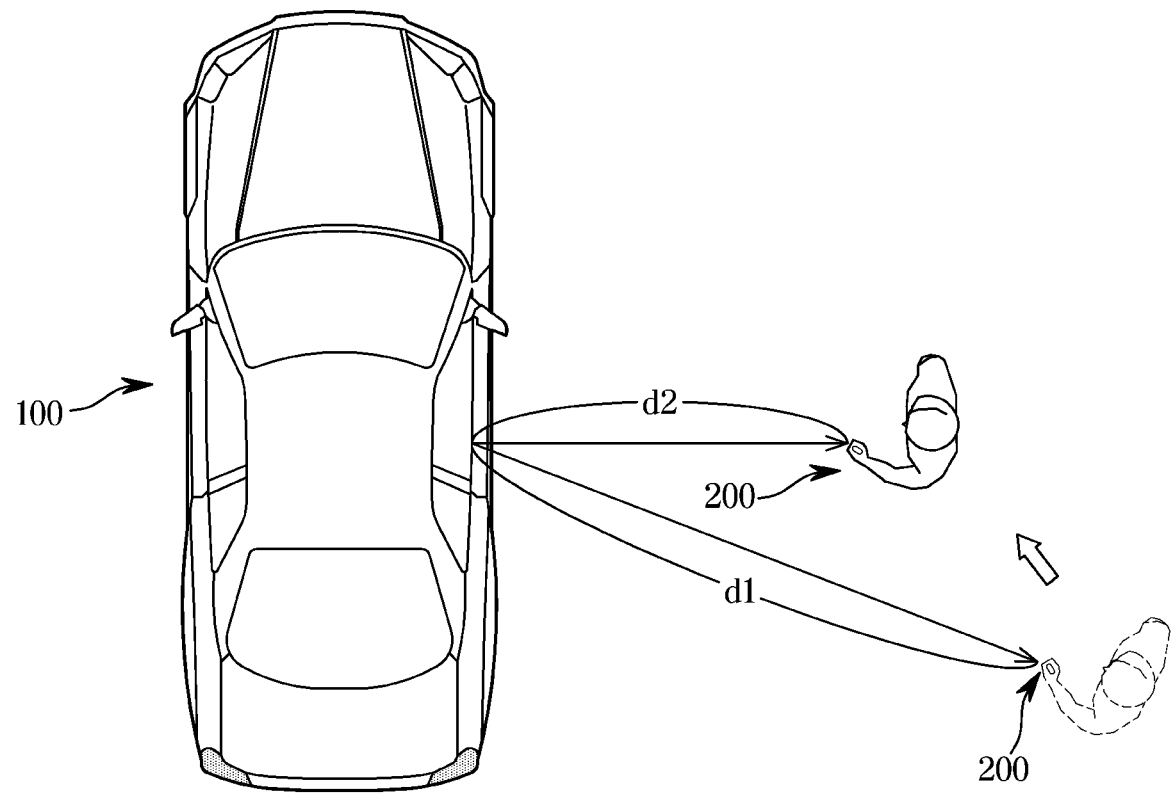
FIG. 3 is a diagram for explaining a process of changing a first reference time and a second reference time based on a distance between a smart key and a vehicle according to an embodiment.

FIG. 3 is a diagram for explaining a process of changing a first reference time and a second reference time based on a distance between a smart key and a vehicle according to an embodiment.

Referring to FIG. 3, the user may move around the vehicle 100 while holding the smart key 200. That is, the smart key 200 may stay in the same location or move after the vehicle 100 starts UWB communication with the smart key 200.

The smart key 200 held by the user may be located at a distance d1 from the vehicle 100 when the first reference time has elapsed from the point of time at which UWB communication is started or restarted, that is, at the point of time at which the UWB communication is stopped.

The controller 120 may not be able to determine the location of the smart key 200 until the second reference time elapses. During this time, the smart key 200 may continue to stay in the same location or may move.

The smart key 200 may be located at a distance d2 from the vehicle 100 when the second reference time has elapsed from the time at which the UWB communication is stopped, that is, when the UWB communication is restarted.

In this case, the controller 120 may change the first reference time and the second reference time based on the distance between the smart key 200 and the vehicle 100 from the time at which the UWB communication is restarted. That is, the time until the UWB communication is stopped and the time until the UWB communication is restarted is changed according to the location of the smart key 200 at the point of time at which the UWB module no performs communication again.

In response to the distance d2 between the smart key 200 and the vehicle boo at the point of time at which UWB communication is restarted being the same as the distance d1 at the point of time at which UWB communication is stopped, the first reference time and the second reference time may not be changed.

In addition, UWB communication may be continuously stopped and restarted, and at this time, in response to the distance between the smart key 200 and the vehicle 100 being changed every time the UWB communication is restarted, the first reference time and the second reference time may also be changed every time the UWB communication is restarted.

As a result, the lengths of the time (first reference time) for which UWB communication is performed and the time for which UWB communication is stopped (second reference time) until UWB communication is restarted again at the point of time at which UWB communication is restarted, may be changed according to the distance d2 between the smart key 200 and the vehicle 100 at the point of time at which UWB communication is restarted.

The longer the distance d2 between the smart key 200 and the vehicle 100 at the point of time at which the UWB module no restarts communication, the controller 120 may decrease the first reference time and increase the second reference time.

For example, in response to d2 being smaller than d1 and the distance between the smart key 200 and the vehicle 100 at the point of time at which UWB communication restarted being d2, the first reference time may increase and the second reference time may decrease compared to when the distance between the smart key 200 and the vehicle 100 at the point of time at which UWB communication is restarted is d1. That is, as the smart key 200 is located closer to the vehicle 100 at the point of time at which UWB communication is restarted, the time for UWB communication to be performed may be longer and the time for UWB communication to be stopped may be shorter.

Conversely, in response to d2 being greater than d1 and the distance between the smart key 200 and the vehicle 100 at the point of time at which UWB communication is restarted being d2, the first reference time may increase and the second reference time may decrease compared to when the distance between the smart key 200 and the vehicle 100 at the point of time at which UWB communication is restarted is d1. That is, as the smart key 200 is located farther away from the vehicle 100 at the point of time at which UWB communication is restarted, the time for UWB communication to be performed may be shorter and the time for UWB communication to be stopped may be longer.

Figure 4:
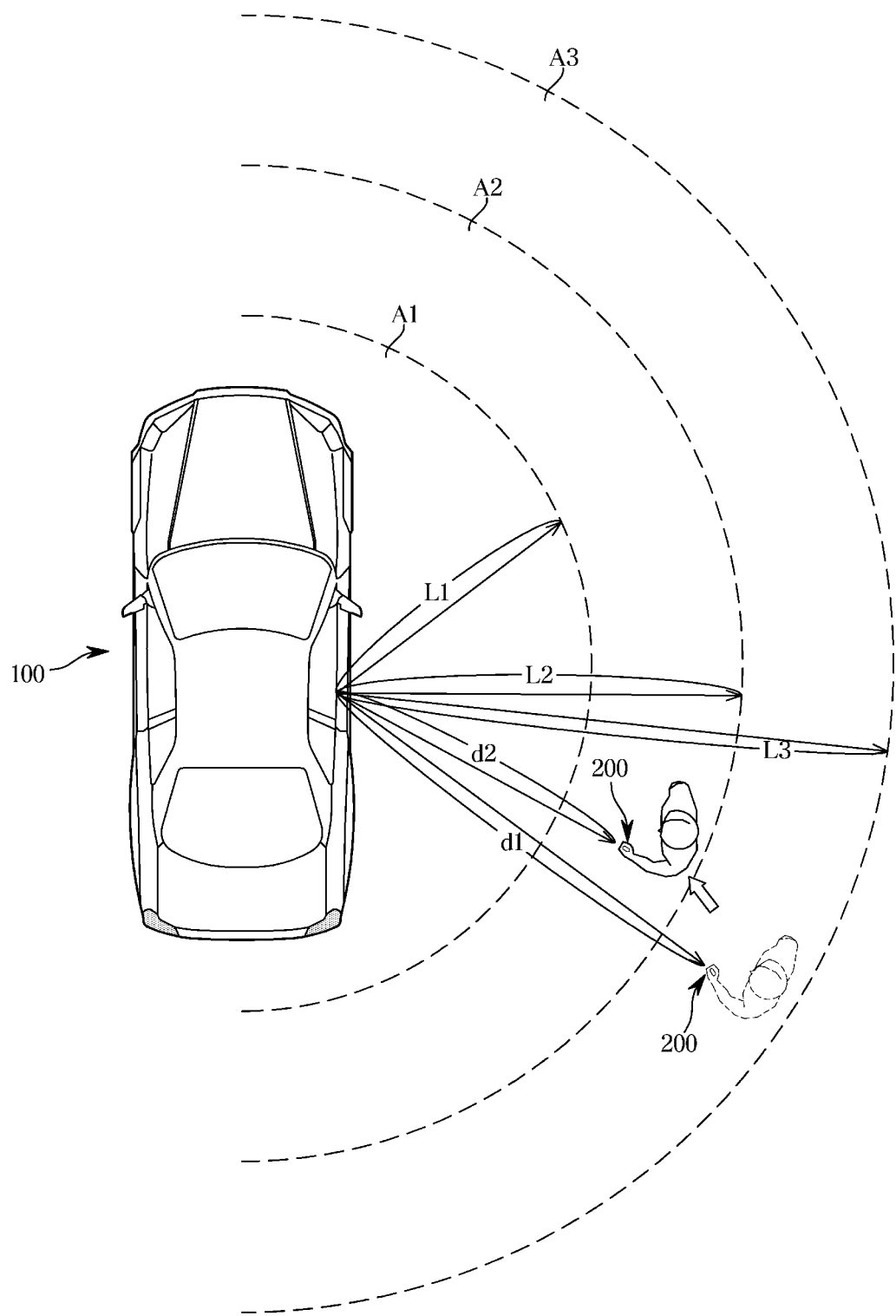
FIG. 4 is a diagram for explaining a process of changing a first reference time and a second reference time based on a reference region in which a smart key is located, according to an embodiment.

FIG. 4 is a diagram for explaining a process of changing a first reference time and a second reference time based on a reference region in which a smart key is located, according to an embodiment.

Referring to FIG. 4, the controller 120 may set a plurality of reference regions A1, A2 and A3 according to a preset distance from the vehicle 100.

Hereinafter, examples in which the first region A1 that is a region close to the vehicle 100, the second region A2 that is the second closest region to the vehicle boo and the third region A3 that is the farthest region from the vehicle 100 are set will be described.

The first region A1 may be a region having a distance less than a first reference distance L1 from the vehicle 100, the second region A2 may be a region having a distance greater than or equal to the first reference distance L1 and less than a second reference distance L2 from the vehicle 100, and the third region A3 may be a region having a distance from the vehicle 100 that is greater than or equal to the second reference distance L2 and less than the third reference distance L3.

That is, locating the smart key 200 in the first region A1 may mean that the distance between the vehicle 100 and the smart key 200 is less than the first reference distance L1, locating the smart key 200 in the second region A2 may mean that the distance between the vehicle 100 and the smart key 200 is greater than or equal to the first reference distance L1 and less than the second reference distance L2, and locating the smart key 200 in the third region A3 may mean that the distance between the vehicle 100 and the smart key 200 is greater than or equal to the second reference distance L2 and less than the third reference distance L3.

In addition, the plurality of reference regions A1, A2, and A3 may be divided into several regions according to a reference distance in addition to the first region A1, the second region A2, and the third region A3.

Here, the first region A1 may be a region in which the vehicle 100 may provide a specific function using the smart key 200 in response to the smart key 200 being located. For example, in response to the smart key 200 being located in the first region A1, the controller 120 the controller 120 may unlock the door by controlling the door locking device, and in this case, the first reference distance L1 may be 2M.

The second region A2 may be a region capable of operating parking assist using the smart key 200. For example, the second reference distance L2 may be 6 m.

In response to the parking assist using the smart key 200 being operated, the controller 120 may not stop UWB communication even after the first reference time from the UWB communication restart time has elapsed.

At this time, the timer 130 measures the time again from the point when the parking assist using the smart key 200 is stopped, and at this time, the controller 120 may control the UWB module 110 to stop UWB communication in response to the time measured by the timer 130 being past the first reference time.

The third region A3 may be a region in which Bluetooth communication is possible between the vehicle 100 and the smart key 200. For example, the third reference distance L3 may be 15 m.

Specific lengths of the above-described first reference distance L1, second reference distance L2, and third reference distance L3 are merely examples, and each reference distance may have a different length.

In addition, each reference distance may be different based on the reception state of the UWB communication at the time when the UWB module no first starts communication. This process will be described below with reference to FIG. 5.

The controller 120 may determine the first reference time and the second reference time based on the reference region in which the smart key 200 is located at the point of time at which the UWB communication is restarted.

That is, the time until the next UWB communication is stopped and the time until the next UWB communication is restarted according to the reference region where the smart key 200 is located at the point of time at which the UWB module 110 performs communication again, will be different.

The controller 120 may control the UWB module 110 to perform UWB communication during the first reference time corresponding to the reference region where the smart key 200 is located at the point of time at which the UWB module 110 performs communication again. Next, the controller 120 may control the UWB module no to stop UWB communication during the second reference time corresponding to the reference region where the smart key 200 is located in the point of time at which the UWB module 110 performs communication again.

In response to the reference region in which the smart key 200 is located at the point of time at which UWB communication is restarted being the same as the reference region at the point of time at which UWB communication is stopped, the first reference time and the second reference time may not be different.

In addition, UWB communication may be repeatedly stopped and restarted, and in this case, in response to the reference region in which the smart key 200 is located being changed every time UWB communication is restarted, the first reference time and the second reference time may also be changed every time the UWB communication is restarted.

As a result, the lengths of the time (first reference time) for which UWB communication is performed and the time for which UWB communication is stopped (second reference time) until UWB communication is restarted again at the point of time at which UWB communication is restarted, may be changed according to the reference region where the smart key 200 is located at the point of time at which UWB communication is restarted.

The controller 120 may store the first reference time and the second reference time corresponding to each reference region in the memory 140.

As the reference region is the reference region located farther away from the vehicle 100, the controller 120 may decrease the first reference time corresponding to the reference region and increase the second reference time. That is, the first reference time corresponding to the reference region located at a far distance from the vehicle 100 may be shorter than the first reference time corresponding to the reference region located at a close distance from the vehicle 100, and the second reference time corresponding to the reference region located at a far distance from the vehicle 100 may be longer than the second reference time corresponding to the reference region located at a close distance from the vehicle 100.

For example, in response to the region where the smart key 200 is located at the point of time at which UWB communication is restarted being the second region A2, the region where the smart key 200 is located at the time when UWB communication is restarted may have a longer first reference time and a shorter second reference time than that of the first region A1.

On the other hand, the controller 120 may not know with certainty in which reference region the location of the smart key 200 is. For example, the distance from the vehicle 100 serving as the boundary between the second region A2 and the third region A3 is set as the second reference distance L2, but for the result of determining the location of the smart key 200 by the controller 120 through UWB communication, it may not be clear whether the smart key 200 is in the second region A2 or the third region A3 since the smart key 200 is located about the second reference distance L2 from the vehicle 100.

In this case, the controller 120 may determine that the smart key 200 is located in an original reference region until it is clearly known in which reference region the smart key 200 is located.

For example, if it is unclear whether the location of the smart key 200 when UWB communication is restarted is the second region or the third region, the controller 120 may determine the reference region where the smart key 200 is located at the point of time at which the UWB communication is stopped immediately before as the location of the smart key 200 at the point of time at which the current UWB communication is restarted.

In this case, the controller 120 may control the UWB module 110 to perform UWB communication during the first reference time corresponding to the reference region where the smart key 200 is located at the point of time at which the UWB communication is stopped immediately before, and then control the UWB module 110 to stop the UWB communication during the second reference time corresponding to the reference region where the smart key 200 is located at the point of time at which the UWB communication is stopped immediately before.

For example, if the controller 120 determines that the location of the smart key 200 was definitely in the third region at the point of time at which UWB communication was stopped, and if it is unclear whether the location of the smart key 200 is the second region or the third region when UWB communication is restarted, the controller 120 may determine that the smart key 200 is in the third region when UWB communication is restarted. At this time, the controller 120 controls the UWB module no to perform UWB communication during the first reference time corresponding to the third region, and then control the UWB module no to stop UWB communication during the second reference time corresponding to the third region.

The above example is an example in which the smart key 200 is in the third region when UWB communication is stopped and moved to an ambiguous location to which reference region it belongs to, but the same can be applied even when the smart key 200 was in the second region or the first region.

Figure 5:
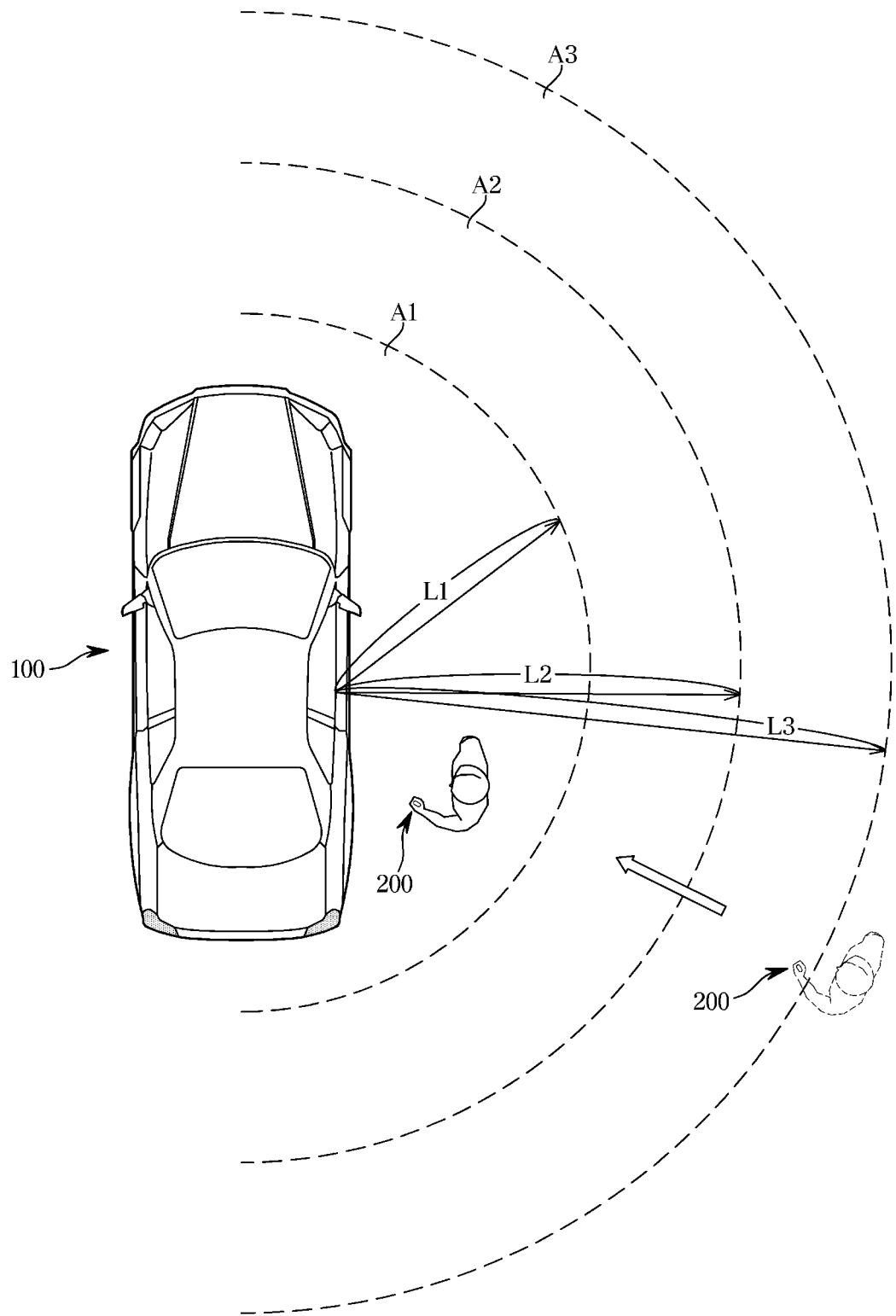
FIG. 5 is a diagram illustrating a process from when UWB communication starts to ends according to an embodiment.

FIG. 5 is a diagram illustrating a process from when UWB communication starts to ends according to an embodiment.

Referring to FIG. 5, a user holding the smart key 200 may be outside the third region A3 and then come inside.

The vehicle 100 may include the Bluetooth module 150 for receiving a Bluetooth signal transmitted from the smart key 200.

Bluetooth communication is a communication technology that enables low-power wireless communication between information devices that are separated from several meters to several tens of meters. The Bluetooth module 150 may communicate with the smart key 200. Specifically, a Bluetooth signal may be transmitted to the smart key 200, and another Bluetooth signal transmitted from the smart key 200 may be received. The controller 120 may control the UWB module no to start UWB communication at the point of time at which a reception of the Bluetooth signal is started.

The third region A3 may be a region in which Bluetooth communication is possible between the vehicle 100 and the smart key 200, and at a point of time when the user enters the third region A3 while holding the smart key 200, the Bluetooth module 150 may transmit and receive a Bluetooth signal with the smart key 200.

In this case, from the point of time at which the smart key 200 enters the third region A3, the UWB module no may start UWB communication, which is a basis for determining the location of the smart key 200. In addition, the timer 130 may measure the time from the point of time at which the smart key 200 entered the third region A3, and the controller 120 may control the UWB module no to terminate UWB communication when the third reference time has elapsed based on the time measured by the timer 130.

If the third reference time has elapsed based on the time measured by the timer 130 and the battery state of the vehicle 100 is low voltage, the controller 120 may control the Bluetooth module 150 to also terminate Bluetooth communication.

The controller 120 may set a plurality of reference regions based on the reception state of the UWB communication at the point of time at which the UWB module no starts communication.

For example, if the reception state of UWB communication is good at the point of time at which the UWB module no starts communication, a range of each reference region A1, A2, and A3 may be kept the same based on a preset distance, and if the reception state of UWB communication is poor, the range of each reference region A1, A2, and A3 may be expanded beyond a range based on a preset distance.

That is, if the reception state of UWB communication is poor, the controller 120 may make it more clear to which reference region the location of the smart key 200 belongs by expanding the range of each reference region A1, A2, and A3. However, when the parking assist using the smart key 200 is operated, the controller 120 may not change the range of the reference region. The controller 120 may set a plurality of reference regions based on whether there are obstacles around the vehicle 100 at the point of time at which the UWB module no starts communication.

For example, when an obstacle is detected around the vehicle 100 at the point of time at which the UWB module no starts communication, the range of each reference region A1, A2, and A3 may be expanded beyond the range based on the preset distance.

That is, when the obstacle is detected around the vehicle 100, the controller 120 may make it more clear to which reference region the location of the smart key 200 belongs by expanding the range of each reference region A1, A2 and A3.

Bluetooth communication between the smart key 200 and the vehicle 100 may be disconnected when the user holding the smart key 200 leaves the region A3 where Bluetooth communication is possible or for various other reasons.

In response to the smart key 200 being outside the region A1 having the preset range from the vehicle 100 at the point of time when the Bluetooth signal reception is disconnected, the controller 120 may control the UWB module no to terminate UWB communication.

That is, even if UWB communication has started, in response to the user moving away from the vehicle 100 to a place where Bluetooth communication is not possible because the user does not intend to use the smart key 200, UWB communication may be completely terminated to prevent power consumption.

On the other hand, even if Bluetooth communication is disconnected, the controller 120 may not control the UWB module no to terminate UWB communication because the user has a high intention to use the smart key 200 in response to the smart key 200 being within the region A1 having the preset range from the vehicle 100. In this case, the controller 120 may control the UWB module no to terminate the UWB communication in response to the controller 120 providing a specific function that the smart key 200 is used according to operation of the smart key 200 of the user while maintaining the UWB communication.

Figure 6:
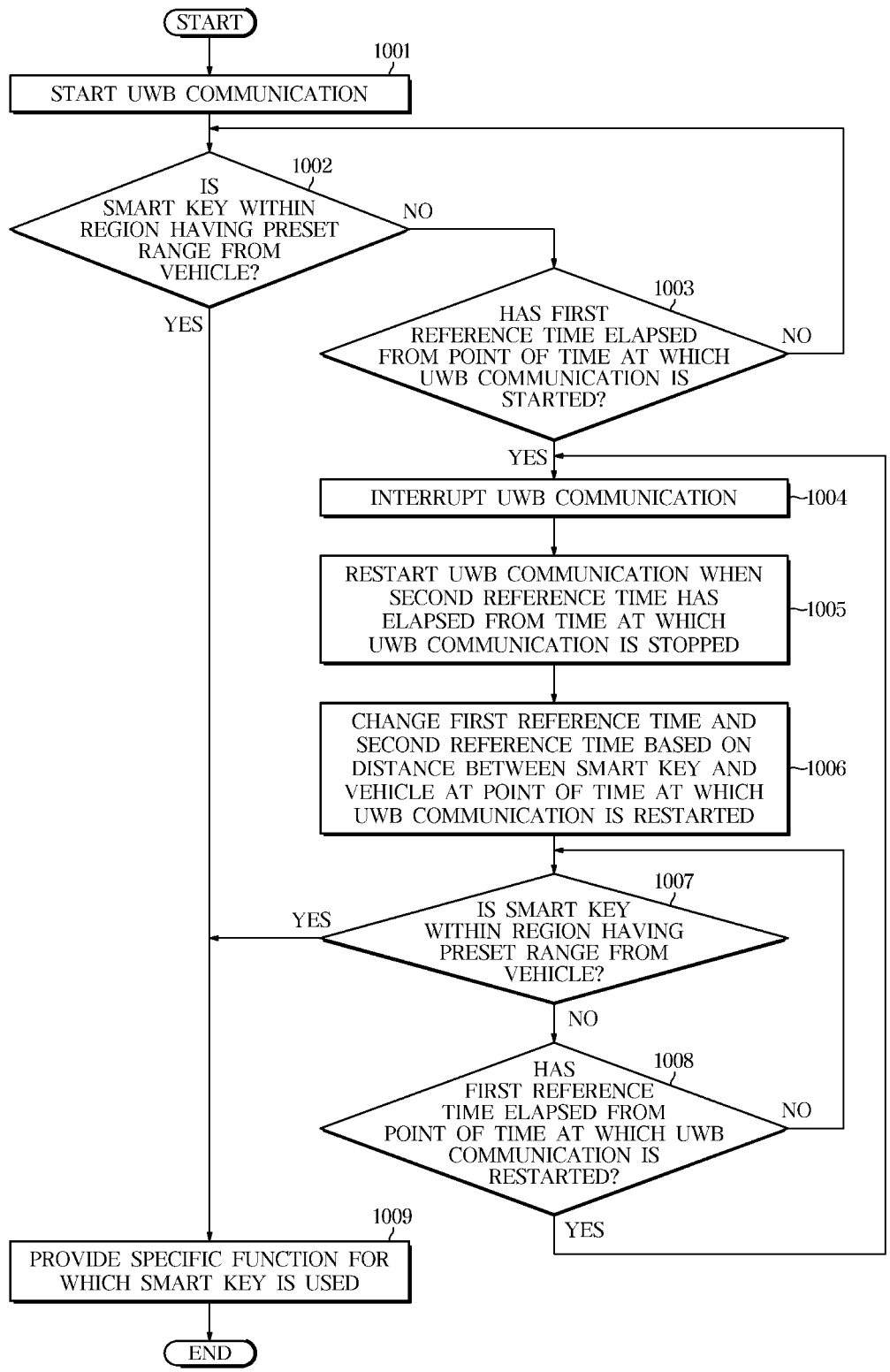
FIG. 6 is a flowchart of a method for controlling a vehicle according to an embodiment.

FIG. 6 is a flowchart of a method for controlling a vehicle according to an embodiment. This is only a preferred embodiment of the present invention, and some configurations may be added or deleted as needed.

Referring to FIG. 6, the controller 120 may control the UWB module no to start UWB communication with the smart key 200 (1001).

At this time, the controller 120 may control the UWB module no to start UWB communication at the point of time at which the Bluetooth module 150 starts receiving the Bluetooth signal from the smart key 200.

The controller 120 may determine the location of the smart key 200 based on the UWB signal received through the UWB module 110.

The controller 120 may control the vehicle 100 to provide a specific function in which the smart key 200 is used based on the location of the smart key 200.

For example, in response to the smart key 200 entering the region A1 having the preset range from the vehicle 100, the controller 120 may control the door locking device to unlock the door.

The controller 120 may determine whether the smart key 200 is within the region A1 having the preset range from the vehicle 100 (1002).

In response to determining that the smart key 200 is within the region A1 having the preset range from the vehicle 100 (Yes of 1002), the controller 120 may control the vehicle 100 to provide a specific function for which the smart key 200 is used (1009).

In response to determining that the smart key 200 is outside the region A1 having a preset range from the vehicle 100 (No in 1002), the controller 120 determines whether the first reference time has elapsed from the point of time at which the UWB communication is started based on the time measured by the timer 130 (1003).

When the first reference time from the point of time at which UWB communication is started has not elapsed (No in 1003), it may be determined whether the location of the smart key 200 is within the region A1 having the preset range from the vehicle 100 (1002).

After the first reference time has elapsed from the point of time at which the UWB module no starts communication ('Yes' in 1003), the controller 120 may control the UWB module 110 to stop UWB communication (1004).

In response to the second reference time elapsing from the point of time at which the UWB module no stops communication, the controller 120 may control the UWB module no to restart UWB communication (1005).

The controller 120 may change the first reference time and the second reference time based on the distance between the smart key 200 and the vehicle 100 at the point of time at which the UWB module no restarts communication (1006).

Changing the first reference time and the second reference time based on the distance may include changing based on the length of the distance between the smart key 200 and the vehicle 100 at the point of time at which UWB communication is restarted.

That is, as the distance between the smart key 200 and the vehicle 100 increases at the point of time at which the UWB module no restarts communication, the first reference time may be decreased and the second reference time may be increased. On the other hand, changing the first reference time and the second reference time based on the distance may include changing the first reference time and the second reference time corresponding to the reference region where the smart key 200 is located at the point of time at which the UWB module 110 restarts communication.

In response to UWB communication restarting, the controller 120 may again determine whether the smart key 200 is within the region A1 having a preset range from the vehicle 100 (1007).

At this time, in response to determining that the smart key 200 is within the region A1 having the preset range from the vehicle 100 (Yes of 1007), the controller 120 may control the vehicle 100 to provide a specific function for which the smart key 200 is used (1009).

In response to determining that the smart key 200 is outside the region A1 having the preset range from the vehicle 100 (No of 1007), the controller 120 determines whether the first reference time has elapsed from the point of time at which the UWB communication is restarted based on the time measured by the timer 130 (1008).

When the first reference time from the point of time at which UWB communication is restarted has not elapsed (No in 1008), it may be determined whether the location of the smart key 200 is within the region A1 having the preset range from the vehicle 100 (1007).

After the first reference time has elapsed from the point of time at which the UWB module no restarts communication (Yes in 1008), the controller 120 may control the UWB module 110 to stop UWB communication (1004).

Meanwhile, the disclosed embodiments may be embodied in the form of a recording medium storing instructions executable by a computer. The instructions may be stored in the form of program code and, when executed by a processor, may generate a program module to perform the operations of the disclosed embodiments. The recording medium may be embodied as a computer-readable recording medium.

The computer-readable recording medium includes all kinds of recording media in which instructions which may be decoded by a computer are stored, for example, a Read Only Memory (ROM), a Random Access Memory (RAM), a magnetic tape, a magnetic disk, a flash memory, an optical data storage device, and the like.

Although exemplary embodiments of the present invention have been described for illustrative purposes, those skilled in the art will appreciate that various modifications, additions and substitutions are possible, without departing from the scope and spirit of the present invention. Therefore, exemplary embodiments of the present invention have not been described for limiting purposes.

What is claimed is:

1. A vehicle comprising:
    a UWB (ultra-wideband) module configured to receive a UWB signal transmitted from a smart key; and
    a Bluetooth module configured to receive a Bluetooth signal transmitted from the smart key;
    a controller configured to:
        determine a location of the smart key based on the UWB signal received through the UWB module;
        control the UWB module to stop UWB communication after a first reference time has elapsed from a point of time at which the UWB module starts communication; and
        control the UWB module to restart the UWB communication after a second reference time has elapsed from a point of time at which the UWB module stops communication;
    wherein the controller is configured to control the UWB module to start the UWB communication at a point of time at which a reception of the Bluetooth signal starts and to control the UWB module to stop the UWB communication in response to the smart key being outside a region with a preset range from the vehicle at a point of time at which the reception of the Bluetooth signal is disconnected.

2. The vehicle according to claim 1, wherein the controller is configured to control the UWB module to stop the UWB communication after the first reference time has elapsed from a point of time at which the UWB module restarts communication.

3. The vehicle according to claim 2, wherein the controller is configured to change the first reference time and the second reference time based on a distance between the smart key and the vehicle at the point of time at which the UWB module restarts communication.

4. The vehicle according to claim 3, wherein the controller is configured to decrease the first reference time and increase the second reference time as the distance between the smart key and the vehicle at the point of time at which the UWB module restarts communication increases.

5. The vehicle according to claim 2, wherein the controller is configured to:
  set a plurality of reference regions with a preset range from the vehicle; and
  determine the first reference time and the second reference time based on a reference region of the plurality of reference regions where the smart key is located at the point of time at which the UWB module restarts communication.

6. The vehicle according to claim 5, wherein the controller is configured to decrease the first reference time corresponding to the reference region and increase the second reference time as the reference region is located farther away from the vehicle.

7. The vehicle according to claim 5, wherein the controller is configured to set the plurality of reference regions based on a reception state of the UWB communication at the point of time at which the UWB module starts communication.

8. The vehicle according to claim 1, wherein the controller is configured to control the UWB module to stop the UWB communication after a third reference time has elapsed from the point of time at which the UWB module starts communication.

9. A method for controlling a vehicle, the method comprising:
  receiving a UWB (ultra-wideband) signal transmitted from a smart key by a UWB module;
  determining a location of the smart key based on the UWB signal;
  controlling the UWB module to stop UWB communication after a first reference time has elapsed from a point of time at which the UWB module starts communication;
  controlling the UWB module to restart the UWB communication after a second reference time has elapsed from a point of time at which the UWB module stops communication;
  receiving a Bluetooth signal transmitted from the smart key;
  controlling the UWB module to start the UWB communication at a point of time at which a reception of the Bluetooth signal starts; and
  controlling the UWB module to stop the UWB communication in response to the smart key being outside a region having a preset range from the vehicle at a point of time at which the reception of the Bluetooth signal is disconnected.

10. The method according to claim 9, further comprising controlling the UWB module to stop the UWB communication after the first reference time has elapsed from a point of time at which the UWB module restarts communication.

11. The method according to claim 10, further comprising changing the first reference time and the second reference time based on a distance between the smart key and the vehicle at the point of time at which the UWB module restarts communication.

12. The method according to claim 11, wherein changing the first reference time and the second reference time includes decreasing the first reference time and increasing the second reference time as the distance between the smart key and the vehicle at the point of time at which the UWB module restarts communication increases.

13. The method according to claim 10, further comprising:
  setting a plurality of reference regions having a preset range from the vehicle; and
  determining the first reference time and the second reference time based on a reference region of the plurality of reference regions where the smart key is located at the point of time at which the UWB module restarts communication.

14. The method according to claim 13, wherein determining the first reference time and the second reference time includes decreasing the first reference time corresponding to the reference region and increasing the second reference time as the reference region is located further away from the vehicle.

15. The method according to claim 13, further comprising setting the plurality of reference regions based on a reception state of the UWB communication at the point of time at which the UWB module starts communication.

16. The method according to claim 9, further comprising controlling the UWB module to stop the UWB communication after a third reference time has elapsed from the point of time at which the UWB module starts communication.

17. A vehicle comprising:
  a Bluetooth module;
  a plurality of UWB (ultra-wideband) modules;
  a processor; and
  a non-transitory memory storing a program that, when executed by the processor, causes the processor to:
    determine a location of a smart key based on a UWB signal received through the UWB module;
    control the UWB module to stop UWB communication after a first reference time has elapsed from a point of time at which the UWB module starts communication;
    control the UWB module to restart the UWB communication after a second reference time has elapsed from a point of time at which the UWB module stops communication; and
    control the UWB module to start the UWB communication at a point of time at which a reception of a Bluetooth signal at the Bluetooth module starts; and
    control the UWB module to stop the UWB communication in response to the smart key being outside a region with a preset range from the vehicle at a point of time at which the reception of the Bluetooth signal is disconnected.

18. The vehicle according to claim 17, wherein the program causes the processor to control the UWB module to stop the UWB communication after the first reference time has elapsed from a point of time at which the UWB module restarts communication.

19. The vehicle according to claim 18, wherein the program causes the processor to change the first reference time and the second reference time based on a distance between the smart key and the vehicle at the point of time at which the UWB module restarts communication.

20. The vehicle according to claim 18, wherein the program causes the processor to:
- set a plurality of reference regions with a preset range from the vehicle; and
- determine the first reference time and the second reference time based on a reference region of the plurality of reference regions where the smart key is located at the point of time at which the UWB module restarts communication.

* * * * *